United States Patent
Bondura

(10) Patent No.: US 8,210,442 B2
(45) Date of Patent: Jul. 3, 2012

(54) SYSTEM AND METHOD FOR CONSERVING WATER

(76) Inventor: Christopher Sharp Bondura, Greenville, SC (US)

( * ) Notice: Subject to any disclaimer, the term of this patent is extended or adjusted under 35 U.S.C. 154(b) by 567 days.

(21) Appl. No.: 12/363,149

(22) Filed: Jan. 30, 2009

(65) Prior Publication Data

US 2010/0193049 A1    Aug. 5, 2010

(51) Int. Cl.
  *G05D 23/02* (2006.01)
  *F16K 17/38* (2006.01)
  *F16K 1/00* (2006.01)
  *A47K 1/00* (2006.01)
  *E03C 1/23* (2006.01)

(52) U.S. Cl. .......... 236/93 R; 137/468; 137/872; 4/626; 4/693

(58) Field of Classification Search ............... 236/93 R, 236/93 B, 99 J, 99 K; 137/468, 872; 4/625, 4/626, 688, 693
See application file for complete search history.

(56) References Cited

U.S. PATENT DOCUMENTS

| | | | | |
|---|---|---|---|---|
| 5,147,532 A | * | 9/1992 | Leek, Jr. | 210/97 |
| 5,287,570 A | * | 2/1994 | Peterson et al. | 4/626 |
| 2006/0196952 A1 | * | 9/2006 | Willsford et al. | 236/12.15 |

* cited by examiner

*Primary Examiner* — Chen Wen Jiang
(74) *Attorney, Agent, or Firm* — Dority & Manning, P.A.

(57) ABSTRACT

A system and method for conserving water in a hot and cold water system collects hot water that is discharged prior to the water reaching a desired temperature. A receptacle is disposed for receipt of cold and hot water from a water system, and a drain line is configured with the receptacle to drain water from the receptacle to a first collection site. A diverter valve is configured in the drain line and operates between a first position wherein water from the receptacle is directed to the first collection site, and a second position wherein water from the receptacle is directed to a branch line. A temperature activated valve is provided, and a second collection site disposed downstream of the temperature activated valve. The temperature activated valve has an inlet disposed for receipt of water from the branch line, and is operable between a first position wherein water from the branch line below a defined hot temperature is diverted to the second collection site, and a second position wherein water from the branch line above the defined hot temperature is directed to the first collection site.

11 Claims, 6 Drawing Sheets

COMPLETE SYSTEM SETUP

DIVERTER VALVE IN
COLD POSITION

WATER FLOW TO SEWER/SEPTIC WITH
DIVERTER VALVE IN COLD POSITION

DIVERTER VALVE IN HOT POSITION

COLD GREY WATER FLOW TO HOLDING TANK WITH VALVE IN HOT POSITION

GREY WATER FLOW TO HOLDING TANK STOPPED AFTER WATER HEATS UP

HOT WATER TO SEWER/SEPTIC WITH VALVE IN HOT POSITION

SYSTEM AND METHOD FOR CONSERVING WATER

BACKGROUND

Water is a precious resource that should be conserved. Residential and commercial use of potable water is ever increasing. Some have estimated that the average U.S. citizen uses about 100 gallons of water a day, and municipalities are having an increasingly difficult time meeting these needs. In drought stricken regions, water restrictions are becoming a more common occurrence. Water needs to be conserved and, wherever possible, recycled. Everyone can contribute to this effort.

A significant amount of water is wasted when people turn on the hot water faucet at a sink or tub and let the initial flow of "cold" water run and drain as they wait for the hot water to arrive. People typically do this, for example, when taking a shower or bath, washing their hands or face, shaving, and so forth. A variety of factors can contribute to this wastefulness, such as the type of hot water system, age of the house, insulation on water pipes, presence of a hot water recirculation pump in the water system, and so forth. A person may waste up to 3 gallons of water waiting for bath or shower water to reach a desired temperature, and up to 0.5 gallons per sink event, such as washing their face or hands. This is a significant amount of wasted water.

Thus, a need exists for a system and method that limits the amount of water wasted in a residential or commercial environment while waiting for the water to heat to a desired temperature. The present invention addresses this need.

SUMMARY OF THE INVENTION

Objects and advantages of the invention will be set forth in the following description, or may be obvious from the description, or may be learned through practice of the invention.

An embodiment of the invention includes a system for conserving water in a hot and cold water system by collecting hot water that is discharged prior to the water reaching a desired temperature. The system is particularly suited for residential and commercial buildings, but is not limited to such structures. The system includes a receptacle disposed for receipt of cold and hot water from a water system. This receptacle may be, for example, a sink, a tub, a shower stall, or any other type of fixture of device that is associated with hot and cold running water in a structure. A drain line is configured with the receptacle to drain water from the receptacle to a first collection site.

A diverter valve is configured in the drain line, and is operable between a first position wherein water from the receptacle is directed to the first collection site, and a second position wherein water from the receptacle is directed to a branch line. Any manner of conventional converter valves, such as a Y-valve, may be used for this purpose.

The system includes a temperature activated valve, and a second collection site disposed downstream of the temperature activated valve. The temperature activated valve has an inlet disposed for receipt of water from the branch line. The valve is operable between a first position wherein water from the branch line below a defined "hot" temperature is diverted to the second collection site, and a second position wherein water from the branch line above the defined hot temperature is directed to the first collection site.

In a particular embodiment, the diverter valve is a manually operated valve, and is moved by a user to the first position when "cold" water is selected at the receptacle or fixture for discharge from the water system, and is moved to the second position when hot water is selected for discharge from the water system.

In a particularly advantageous embodiment, the diverter valve is an automatically actuated valve that automatically moves to the first position when cold water is selected by a user for discharge from the water system, and automatically moves to the second position when hot water is selected for discharge from the water system. This valve may respond to sensed positions of the hot and cold water faucets. Any type of electrical or mechanical sensor may be used for this purpose. A commercially available valve may be used as the diverter valve in this embodiment.

The first collection site may vary depending on the type of building structure and water system. For example, the first collection site may be one of a municipal waste water system or septic system.

In a unique embodiment, the temperature activated valve is an automatic valve that automatically moves to the second position upon the water from the branch line reaching the defined hot temperature.

The nature and type of second collection site may vary widely within he scope of the invention. For example, the second collection site may be a holding tank, and may further include a pump configured to discharging water from the holding tank to any manner of downstream usage system, which may be, for example, any combination of gray water system that does not require potable water, such as an irrigation system, cleaning system, fire suppressant system, or any other type of water system wherein potable water is not a necessity.

The system is not limited to a single receptacle. For example, the system may include a plurality of receptacles and associated diverter valves within a building structure, with the diverter valves supplying water to a single temperature activated valve within the structure.

In an alternate embodiment, the system includes a plurality of receptacles within a building structure, with each receptacle having an associated diverter valve and respective temperature activated valve. The plurality of temperature activated valves may direct cold water to a common second collection site in the first position of the temperature activated valves.

The present invention also encompasses a method for conserving water in a hot and cold water system wherein, upon selecting cold water for discharge from the water system at a receptacle, the cold water is diverted to a first collection site. Upon selecting hot water for discharge from the water system at the receptacle, the initial discharge of water below a pre-set "hot" temperature is diverted from the system to a second collection site. Upon the water discharged from the water system reaching the defined hot temperature, the flow path of the water is automatically changed to direct the discharge of the hot water to the first collection site. Finally, the water from the second collection site is subsequently used for any combination of selected water usage systems.

DESCRIPTION OF EMBODIMENTS

Figure 1:
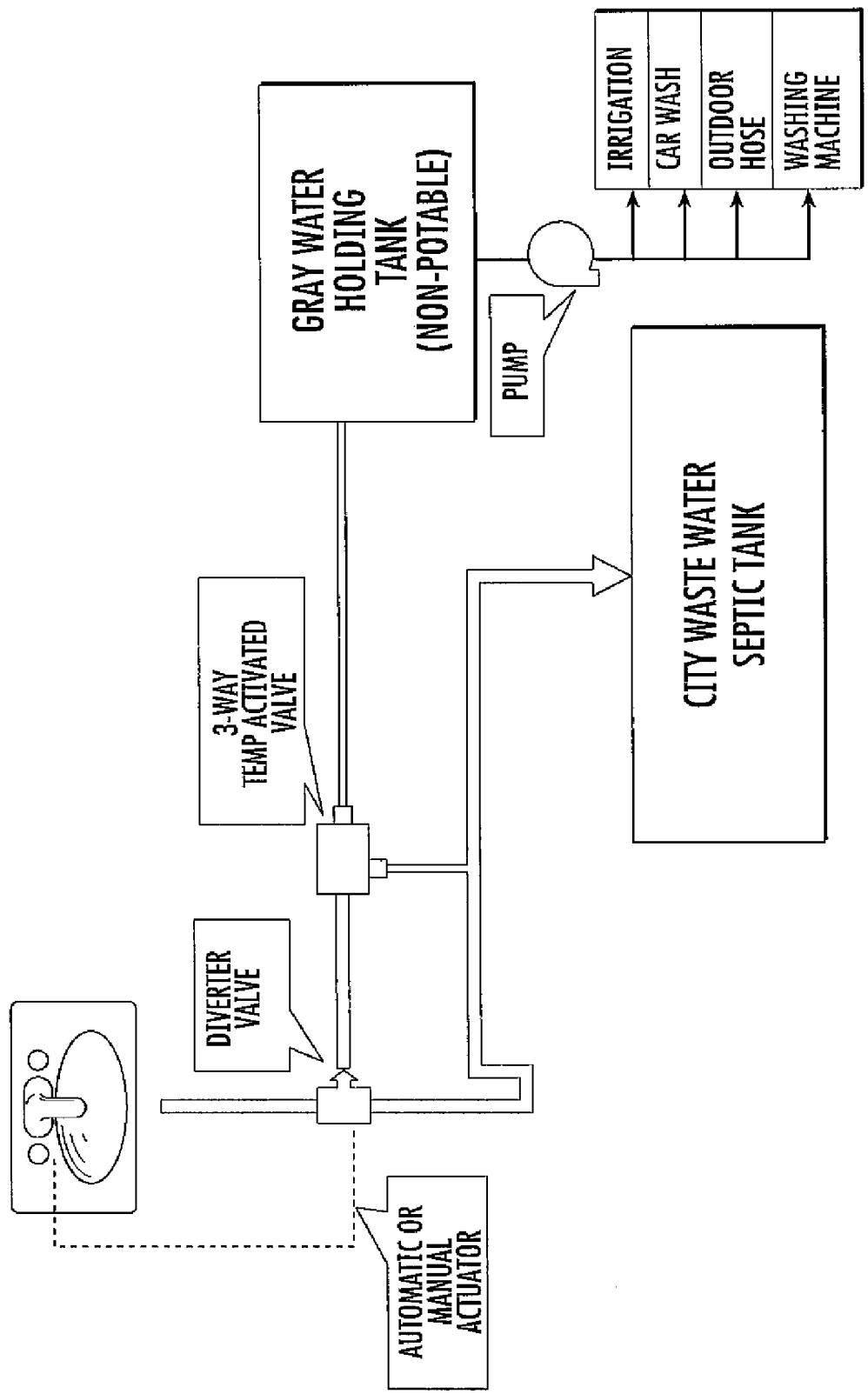
FIG. 1 is a diagram of an example of my system.
Figure 2:
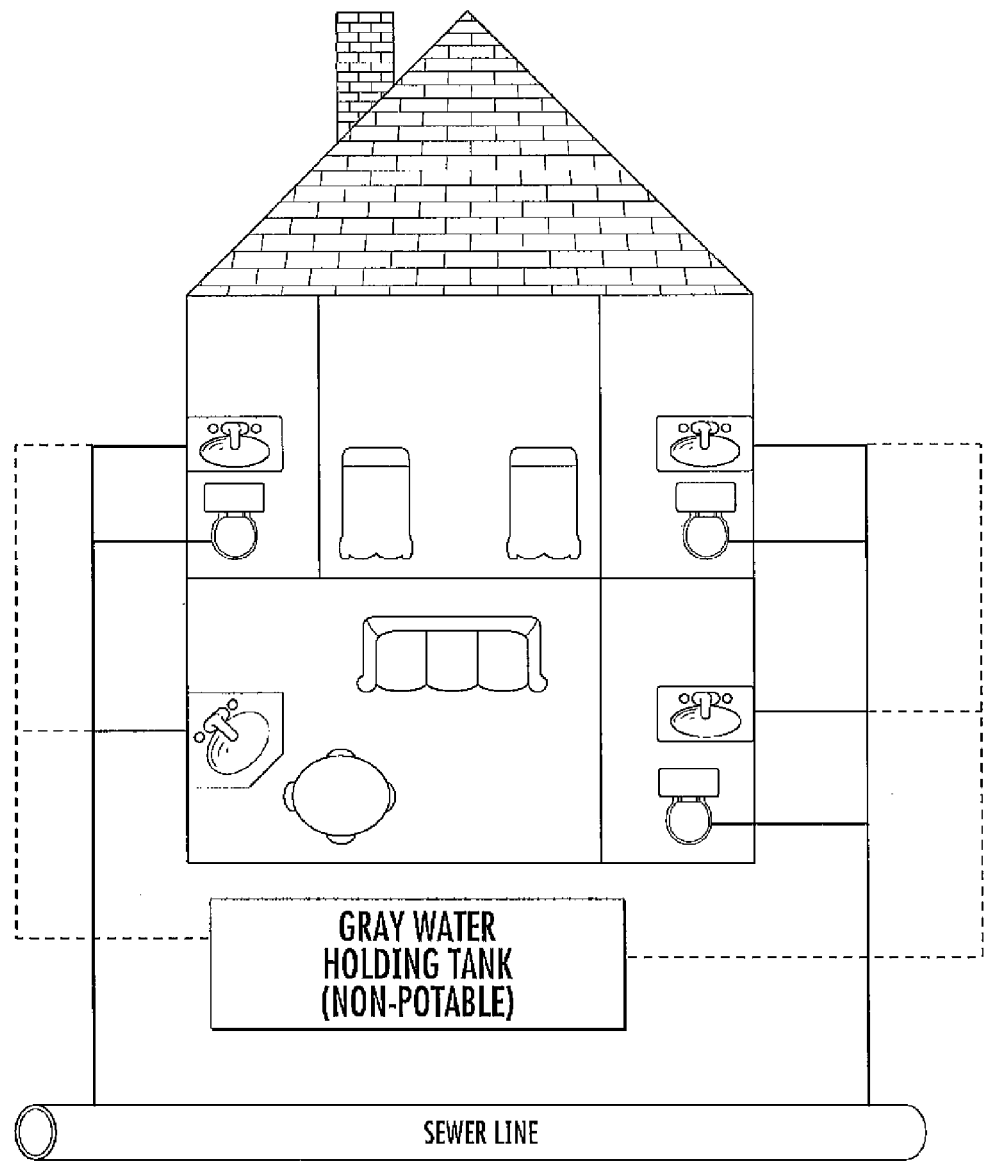
FIG. 2 is a diagram of an example of my system incorporated with the plumbing system of a residential house.

Examples of my system are described below with reference to the pictures of the prototype in FIGS. 3 through 9, and the diagrams of FIGS. 1 and 2. The invention is not limited to these particular examples.

Description of Prototype:

First, I made the display stand and frame. After getting all of the materials together, I laid out the system so that I could cut all of the pipes to the right size to fit on the display stand. I tested the temperature valve with hot water to make sure it worked and then mounted the temperature valve on blocks and screwed the blocks onto the peg board.

Figure 3:
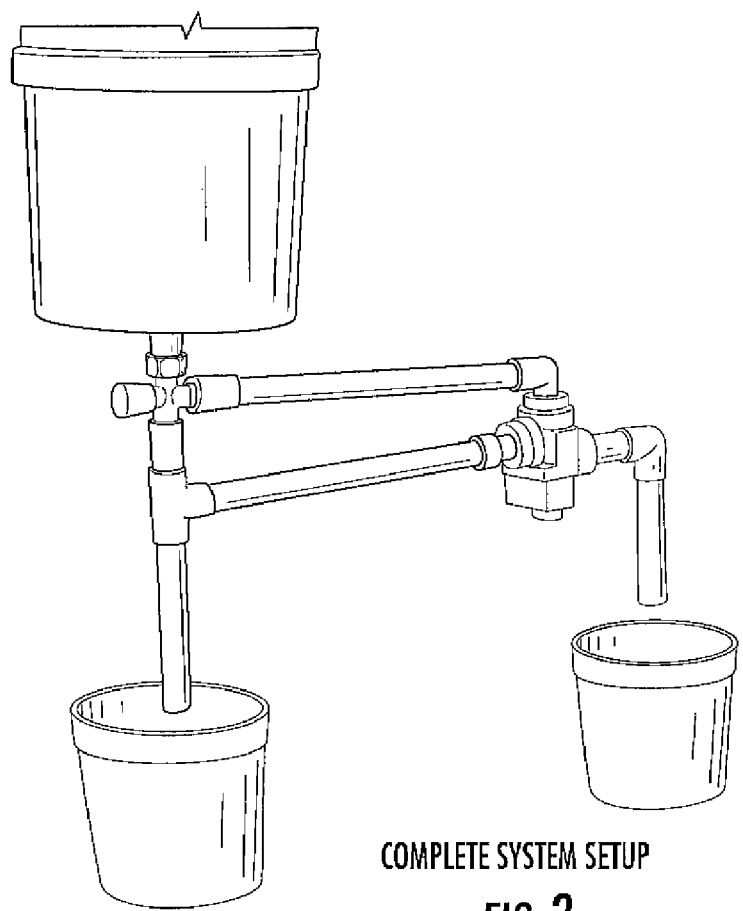
FIGS. 3 through 9 are drawings of a prototype of my system.

I cut a hole in one of the buckets to make a drain and glued a fitting to the drain with epoxy. I connected the diverter valve to the drain, and connected a pipe out of the diverter valve to the sewer/septic tank bucket. I connected the other side of the diverter valve to the inlet of the temperature valve. I connected a pipe from the cold water outlet of the temperature valve to the holding tank bucket, and another pipe from the hot water outlet of the valve into the drain pipe from the diverter valve with a T-fitting. A picture of the complete system is shown in FIG. 3.

The temperature valve was purchased from Fluid Power Energy, Inc., FPE Thermostatic Valves http://www.fpe-valves.com/.

Figure 4:
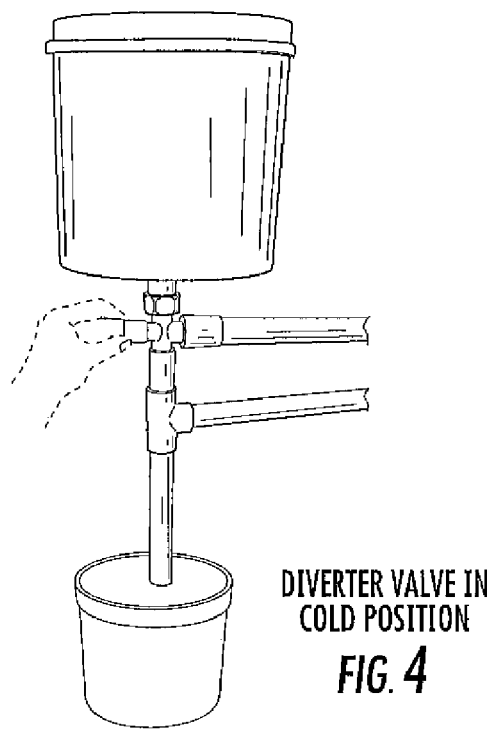
Figure 5:
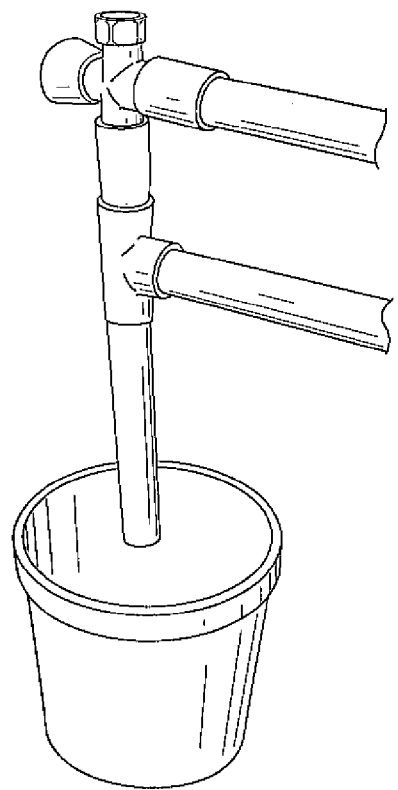

After constructing the system, it was tested to prove that clean grey water can be saved. I set the diverter valve to the Cold Water Position and poured cold water into the bucket just like a person would turn on cold water at the sink. Water flowed right into the drain bucket, as shown in FIGS. 4 and 5.

Figure 6:
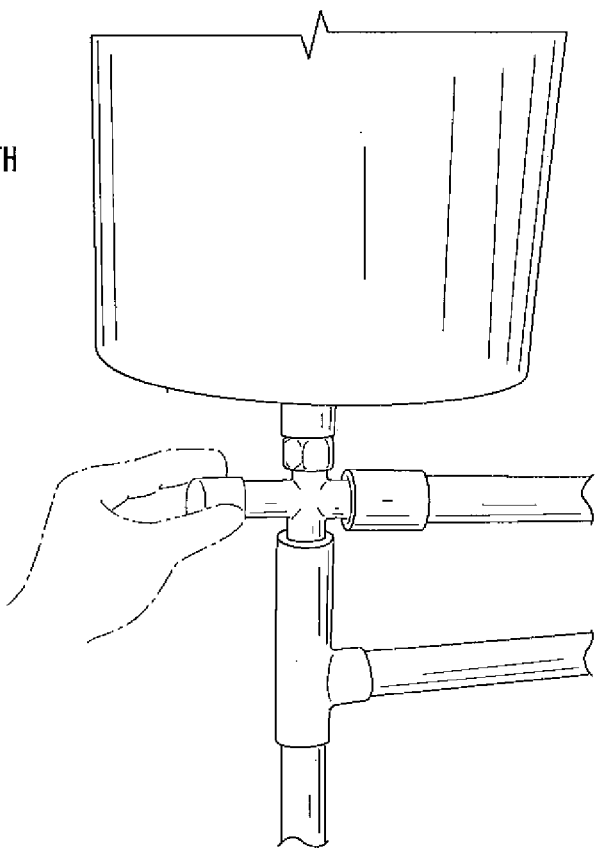

I then switched the diverter valve to the Hot Water Position, as seen in FIG. 6. This would be done by a person at the sink with a mechanical or electrical switch, or automatically when they turn on the hot water.

Figure 7:
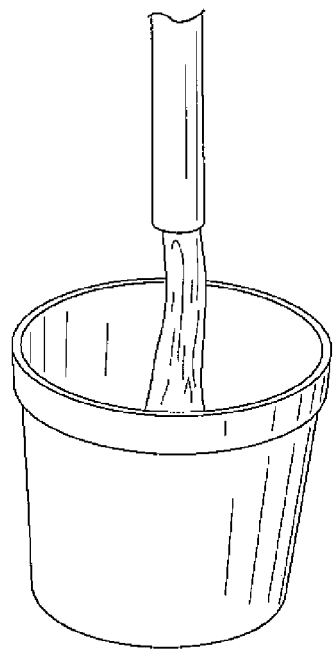

I then poured cold water into the bucket to simulate cold water that comes out of the hot faucet while the water is heating up. This water is grey (semi-clean) water and was directed by the temperature valve into the grey water holding tank bucket, as seen in FIG. 7.

Figure 8:
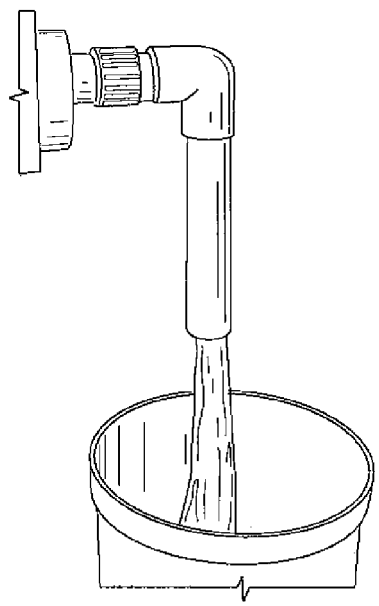
Figure 9:
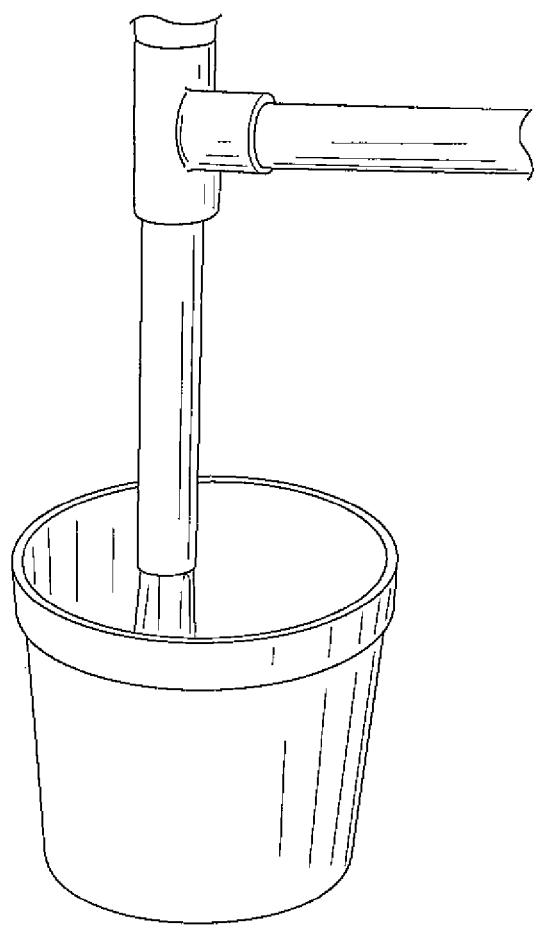

I then poured hot water into the bucket to simulate the water finally heating up to a hot temperature, as seen in FIG. 8. After a couple of seconds, the temperature valve worked and the water stopped flowing into the grey water holding tank bucket. So long as the water stayed hot, it flowed into the drain bucket, as seen in FIG. 9. This simulates a person at the sink or shower after the water has heated up. The water will then drain into the septic or sewer system.

In conclusion, a significant amount of water can be saved by using my system to divert running water until it heats up to a holding tank so that the water can be used again.

What is claimed is:

1. A system for conserving water in a hot and cold water system by collecting hot water that is discharged prior to the water reaching a desired temperature, comprising:
    a receptacle disposed for receipt of cold and hot water from a water system, and a drain line configured with said receptacle to drain water from said receptacle to a first collection site;
    a diverter valve configured in said drain line, said diverter valve operable between a first position wherein water from said receptacle is directed to said first collection site, and a second position wherein water from said receptacle is directed to a branch line;
    a temperature activated valve, and a second collection site disposed downstream of said temperature activated valve, said temperature activated valve having an inlet disposed for receipt of water from said branch line, said temperature activated valve operable between a first position wherein water from said branch line below a defined hot temperature is diverted to said second collection site, and a second position wherein water from said branch line above the defined hot temperature is directed to said first collection site; and
    wherein said diverter valve is a manually operated valve such that a user has the option to move said diverter valve to said second position when hot water is selected for discharge from the water system.

2. The system as in claim 1, wherein said first collection site is one of a municipal waste water system or septic system.

3. The system as in claim 1, wherein said temperature activated valve is an automatic valve that automatically moves to said second position upon the water from said branch line reaching the defined hot temperature.

4. The system as in claim 1, wherein said second collection site is a holding tank, and further comprising a pump configured to discharging water from said holding tank to a selected usage system.

5. The system as in claim 4, wherein said selected usage system comprises a combination of gray water systems that do not require potable water.

6. The system as in claim 1, further comprising a plurality of said receptacles within a building structure, with each receptacle having an associated said diverter valve and temperature activated valve, said plurality off temperature activated valves directing water to a common second collection site is said first position of said temperature activated valves.

7. A system for conserving water in a hot and cold water system by collecting hot water that is discharged prior to the water reaching a desired temperature, comprising:
    a receptacle disposed for receipt of cold and hot water from a water system, and a drain line configured with said receptacle to drain water from said receptacle to a first collection site;
    a diverter valve configured in said drain line, said diverter valve operable between a first position wherein water from said receptacle is directed to said first collection site, and a second position wherein water from said receptacle is directed to a branch line;
    a temperature activated valve, and a second collection site disposed downstream of said temperature activated valve, said temperature activated valve having an inlet disposed for receipt of water from said branch line, said temperature activated valve operable between a first position wherein water from said branch line below a defined hot temperature is diverted to said second collection site, and a second position wherein water from said branch line above the defined hot temperature is directed to said first collection site; and
    further comprising a plurality of said receptacles and associated said diverter valves within a building structure, a plurality of said diverter valves supplying water to a single said temperature activated valve within the structure.

8. A method for conserving water in a hot and cold water system, comprising:
    upon selecting cold water for discharge from the water system at a receptacle, diverting the cold water to a first collection site;
    upon selecting hot water for discharge from the water system at the receptacle, manually positioning a valve to divert the initial water discharged from the system below a defined temperature to a second collection site;

upon the water discharged from the water system reaching the defined hot temperature, automatically directing discharge of the hot water to the first collection site; and
using the water from the second collection site for anyone or more selected water usage systems.

9. The method as in claim 8, wherein the water is directed through a temperature activated valve that automatically directs the hot water to the first collection site upon the water reaching the defined hot temperature.

10. The method as in claim 8, wherein the first collection site is one of a municipal waste water system or septic system.

11. The method as in claim 8, wherein the second collection site is a holding tank, and further comprising pumping the water from the holding tank to the a pump configured to discharging water from said holding tank to the selected usage systems.

* * * * *